(12) United States Patent
Manolatou

(10) Patent No.: US 6,810,190 B2
(45) Date of Patent: Oct. 26, 2004

(54) COMPACT THREE-DIMENSIONAL MODE SIZE CONVERTERS FOR FIBER-WAVEGUIDE COUPLING

(75) Inventor: Christina Manolatou, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 201 days.

(21) Appl. No.: 10/211,395

(22) Filed: Aug. 2, 2002

(65) Prior Publication Data

US 2003/0035620 A1 Feb. 20, 2003

Related U.S. Application Data

(60) Provisional application No. 60/310,688, filed on Aug. 7, 2001.

(51) Int. Cl.[7] ............................. G02B 6/10; G02B 6/26; G02B 6/42; G02B 6/32

(52) U.S. Cl. ..................... 385/129; 385/33; 385/131; 385/28

(58) Field of Search ............................. 385/14, 27, 28, 385/43, 49, 129–132, 33

(56) References Cited

U.S. PATENT DOCUMENTS

| | | | | |
|---|---|---|---|---|
| 4,678,267 A | * | 7/1987 | Burns et al. ................ | 385/43 |
| 4,755,014 A | * | 7/1988 | Stoll et al. ................. | 385/131 |
| 5,078,513 A | | 1/1992 | Spaulding et al. | |
| 5,432,877 A | | 7/1995 | Sun et al. | |
| 5,612,171 A | * | 3/1997 | Bhagavatula .............. | 430/321 |
| 6,058,125 A | * | 5/2000 | Thompson ................. | 372/50 |
| 6,160,927 A | | 12/2000 | Leclere et al. | |
| 6,480,650 B2 | * | 11/2002 | Firth et al. ................ | 385/34 |
| 2003/0035633 A1 | * | 2/2003 | Agarwal et al. ............ | 385/49 |

FOREIGN PATENT DOCUMENTS

JP   03 110 504   5/1991

OTHER PUBLICATIONS

"Design and Fabrication of Monolithic Optical Spot Size Transformers (MOST's) for Highly Efficient Fiber–Chip Coupling," Wenger et al. *IEEE Journal of Lightwave Technology*. Oct.1994. vol. 12, No. 10.

"Integrated Optical Elliptic Couplers: Modeling, Design, and Applications," Wei et al. *IEEE Journal of Lightwave Technology*. May 1997. vol. 15, No. 5.

"Focusing Characteristics of a Wide–Striped Laser Diode Integrated with Mirolens," Shimada et al. *IEEE Journal of Lightwave Technology*. Jun. 1994. vol. 12, No. 6.

"Multiple–Quantum–Well GaInAs/GaInAsP Tapered Broad–Area Amplifiers with Monolithically Integrated Waveguide Lens for High–Power Applications," Koyama et al. *IEEE Photonics Technology Letters*. Aug. 1993. vol. 5, No. 8.

(List continued on next page.)

*Primary Examiner*—David V. Bruce
*Assistant Examiner*—Thomas R Artman
(74) *Attorney, Agent, or Firm*—Gauthier & Connors LLP

(57) ABSTRACT

A 3D coupling system includes a layered structure that receives an input of a defined mode size. The layered structure includes a plurality of layers with varying indexes, and outputs a vertically mode converted beam associated with the input beam. A planar lens structure receives the vertically mode converted beam, and performs lateral mode conversion on the vertically mode converted beam. The 3D coupling structure outputs a laterally and vertically converted beam. A high index-contrast waveguide structure receives the laterally and vertically mode converted beam, and provides the laterally and vertically mode converted beam to a receiving device with less than 1 dB loss.

36 Claims, 17 Drawing Sheets

OTHER PUBLICATIONS

"Planar Lens Devices by CVD Process," Bhagavatula et al. *IEEE Electronic Components & Technology Conference.* Jun. 1993.

"Instantaneous and Controlled Excitation of the Spatial Modes in Planar Processed Multi-Mode Waveguides Obtained by Lithographically Defined Lenses in the Waveguide Core." *IBM Technology Disclosure Bulletin.* Jul. 1993. vol. 36, No. 07.

"Beam Propagation Analysis for Tapered Waveguides: Taking Account of the Curved Phase–Front Effect in Paraxial Approximation," Lee et al. *IEEE Journal of Lightwave Technology.* Nov. 1997. vol. 15, No. 11.

"Two Dimensional Control of Mode Size in Optical Channel Waveguides by Lateral Channel Tapering," Thurston et al. *Optics Letters.* Mar. 1991. vol. 16, No. 5.

* cited by examiner

COMPACT THREE-DIMENSIONAL MODE SIZE CONVERTERS FOR FIBER-WAVEGUIDE COUPLING

PRIORITY INFORMATION

This application claims priority from provisional application Ser. No. 60/310,688 filed Aug. 7, 2001.

This invention was made with government support under Grant Number DMR-9808941, awarded by NSF. The government has certain rights in the invention.

BACKGROUND OF THE INVENTION

The invention relates to the field of optics, and in particular to the formation of mode-size fiber-waveguide couplers.

One of the characteristics of integrated optical devices is that they are based on single-mode high index-contrast waveguiding, which enables the dense integration of these devices on an optical chip. A major disadvantage of this approach is the difficulty of coupling light to and from an optical fiber. By approximating the fiber mode by a gaussian distribution, the mode field diameter (MFD) of the fiber is defined as the diameter of the gaussian power distribution, and is approximately 15% larger than the core diameter.

For a single-mode fiber (SMF) with a flat-end, the typical MFD is between 8 and 10 $\mu$m, and the mode cross-section is ideally circular. A lensed fiber has an output beam diameter of approximately 50% of the typical MFD and approximately a 20 $\mu$m focal length. A high index-contrast waveguide has a fundamental mode in the submicron range, depending on the aspect ratio of the rectangular waveguide core, the mode cross-section is strongly elliptical. This large mode-mismatch leads to a very inefficient fiber-waveguide coupling where most of the power is lost to radiation. The coupling loss between fibers of different MFD, assuming that they are perfectly aligned, is defined as $$loss\ (dB) = -10\log\left\{\frac{4}{\left(\frac{MFD_1}{MFD_2} + \frac{MFD_2}{MFD_1}\right)^2}\right\} \quad \text{Eq. 1}$$

If the ellipticity of a waveguide is ignored and Eq. 1 is applied to get an estimate, the loss associated with the coupling between a fiber and a waveguide with 5-to-1 MFD ratio will be approximately 8.3 dB, which is less than 15% coupling efficiency. This is illustrated with a 2D numerical example hereinbelow. The numerical method used is the Finite Difference Time Domain (FDTD).

FIG. 1A is an electric field diagram and FIG. 1B is a graph of the transmission and reflection response illustrating coupling between a low index-contrast wide waveguide to a high index-contrast waveguide. FIG. 1A shows the low index-contrast wide waveguide having an index of approximately 1.05, a width of 4 $\mu$m, and a MFD of approximately of 4.8 $\mu$m, which is coupled to a high index-contrast narrow waveguide having an index of 3 and a width of 0.25 $\mu$m. The whole system is surrounded by air (n=1). FIG. 1B demonstrates that most of the power is lost to radiation and only 17% of the power is coupled into the waveguide mode.

Most approaches to solving this problem can be broadly classified into to two types depending on whether the coupling schemes reside on the fiber side or the chip side. In the first type of coupling, a fiber tip is modified by tapering and/or lensing to bring the MFD of the fiber mode closer to that of the integrated waveguide. In the second type of coupling, the core of the integrated waveguide, is adiabatically tapered so that the mode fields spreads out into the cladding to match the fiber mode size. Both types of coupling structures have lengths that are a few hundred microns.

Mode conversion schemes that work entirely on the fiber side can lead to critical alignment tolerances as the fiber mode size gets very small. Moreover, there is still a mismatch due to the different mode-shapes, because the fiber being circular and the waveguide being highly elliptical. For these reasons, it is preferable to concentrate most or all the mode matching efforts on the chip-side. Better alignment tolerances are obtained and the added advantage that one kind of fiber can be used to couple light into different photonic integrated circuits (PICs).

SUMMARY OF THE INVENTION

According to one aspect of the invention, there is provided a planar lens coupling system. The planar lens coupling system includes an input fiber providing an input beam of a defined mode size. A first interface layer of a defined index, the first layer includes the radial length of the planar lens. A high index-contrast waveguide is coupled to the first interface layer. The high index-contrast waveguide has the same index as the first interface layer and a mode size that is smaller than the input beam. A second interface layer of a defined index is coupled to the first interface structure. The second interface layer is formed on the propagation axis as impedance matching at the location of maximum intensity. The first and second interface layers lower the mode size of the input beam laterally, thus providing improved coupling between the input fiber and the high index-contrast waveguide.

According to another aspect of the invention, there is provided a 3D coupling system. The 3D coupling system includes a layered structure that receives an input of a defined mode size. The layered structure includes a plurality of layers with varying indexes, and outputs a vertically mode converted beam associated with the input beam. A planar lens structure receives the vertically mode converted beam, and performs lateral mode conversion on the vertically mode converted beam. The planar lens structure outputs a laterally and vertically mode converted beam. A high index-contrast waveguide structure receives the laterally and vertically mode converted beam, and provides the laterally and vertically mode converted beam to a chip device. The high index-contrast waveguide has a mode size smaller than the input beam.

In still another aspect of the invention, there is provided a 3D coupling system that simultaneously performs vertical and lateral mode size conversion. In the vertical dimension of the 3D coupling system includes of a layered structure with quadratically varying refractive index that vertically converts the input fiber mode-size to match the vertical mode-size of the output high index contrast waveguide. In the lateral dimension of the 3D coupling system includes as a planar lens structure. The planar lens structure includes a curved interface. The curved interface has a radius that is chosen to laterally convert the input fiber beam to match the lateral mode-size of the output high index contrast waveguide.

DETAILED DESCRIPTION OF THE INVENTION

The invention presents two basic ideas that allow efficient coupling within only a few μm. For simplicity, it is assumed that the fiber mode is a gaussian beam that has a MFD of approximately 5 μm if coming from a lensed SMF or 10 μm if coming from a flat-end fiber. Alternatively, it can be considered that the input mode field is coming from a large low-index waveguide, which can be viewed as an intermediate stage between the fiber and the high index-contrast waveguide.

FIGS. 2A–2F illustrate an embodiment for coupling using planar lens. Since a mode of a fiber can be approximated by a gaussian beam, using gaussian optics to design lens-like structures can bring the MFD of the fiber down to that of the of the integrated waveguide mode. The analytical part of the design can then be based on the well-known transformation laws for gaussian beams using ABCD matrices. Numerical validation and optimization is performed using the Finite Difference Time Domain (FDTD) method.

Figure 1A:
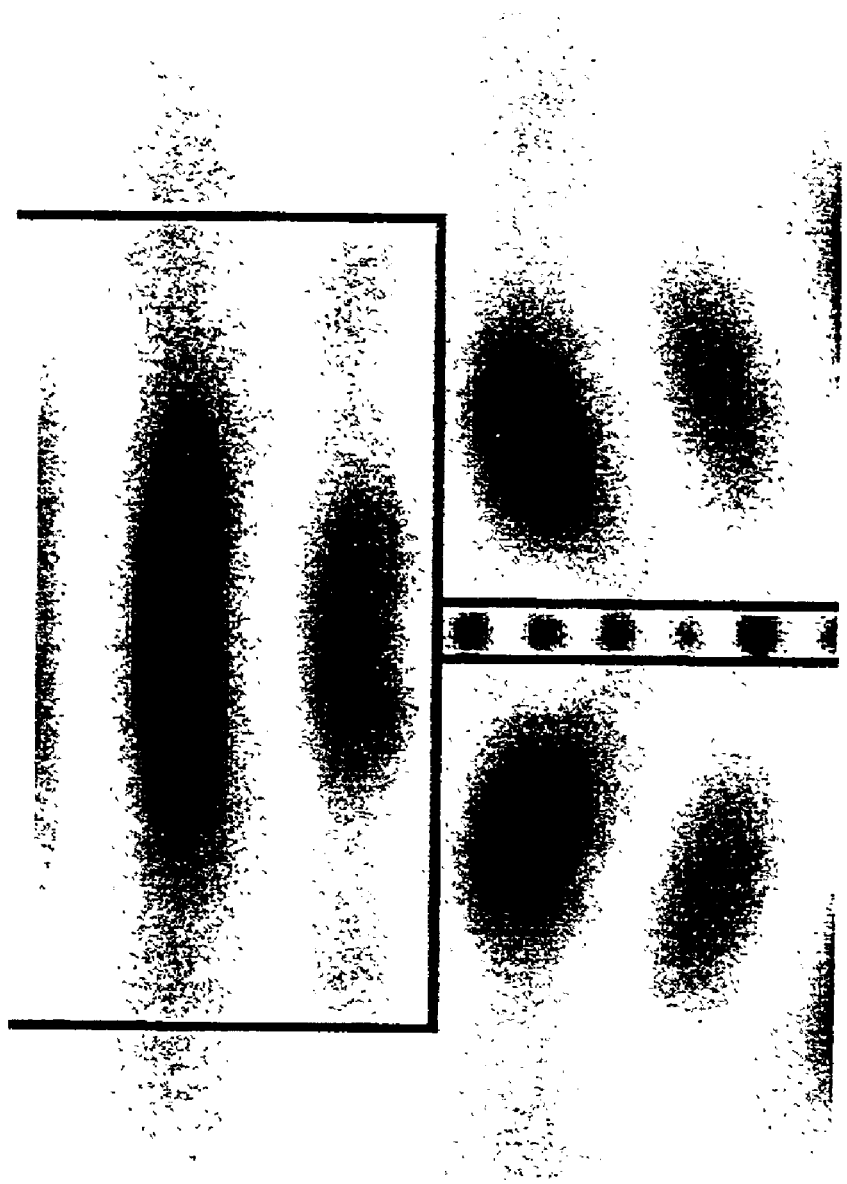
FIGS. 1A and 1B are an electric filed diagram and a graph of the transmission and reflection response obtained by FDTD simulations illustrating coupling between a low index-contrast wide waveguide to a high index-contrast waveguide.
Figure 1B:
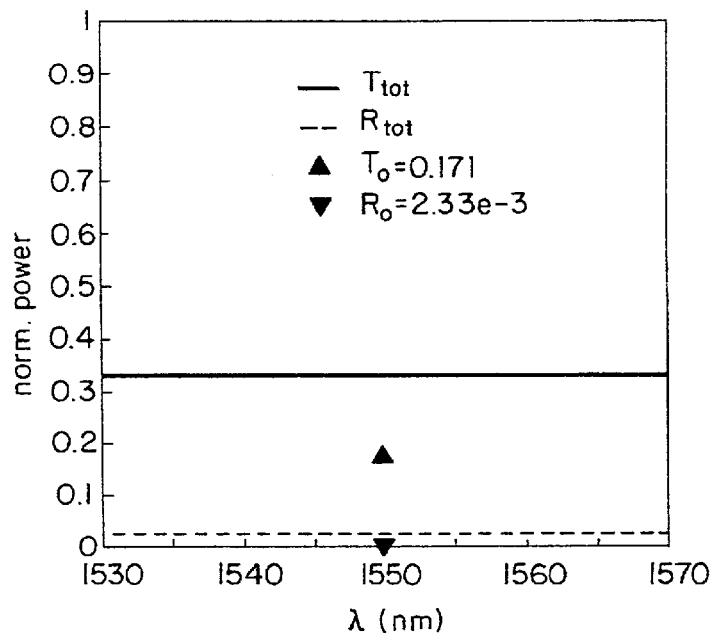
Figure 2A:
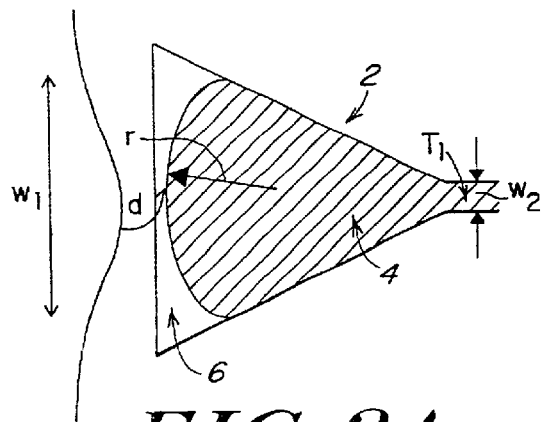
FIGS. 2A and 2B are a schematic block diagram of a planar lens with a flat impedance-matching layer and a graph of the expected beam evolution when the input is provided by a lensed fiber (MFD=5 μm), respectively.

Coupling is achieved in this embodiment through lensing within a distance of only 6 μm. FIG. 2A shows the simple implementation of this idea. The planar lenslike structure 2 is designed to have specific properties, and the structure 2 is surrounded by air ($n_1$=1) or by another low-index material.

Also, the structure 2 includes an interface layer 4. The interface layer 4 further includes a high index-contrast waveguide T1 that has an index $n_3$ that is 3. The width w2 of the high index waveguide is 0.28 μm. The radial length r of the planar lens 2, in this embodiment, is 2.5 μm. The radial length r can also vary. The structure further includes an interface layer 6 that has an index $n_2=\sqrt{n_1 n_3}$ that is 1.73 and a thickness d=λ/$4n_2$ that is 0.22 μm, and is formed on the propagation axis as impedance matching at the location of maximum intensity. The mode width w1 is 5 μm, which is the MFD of the input fiber.

Figure 2B:
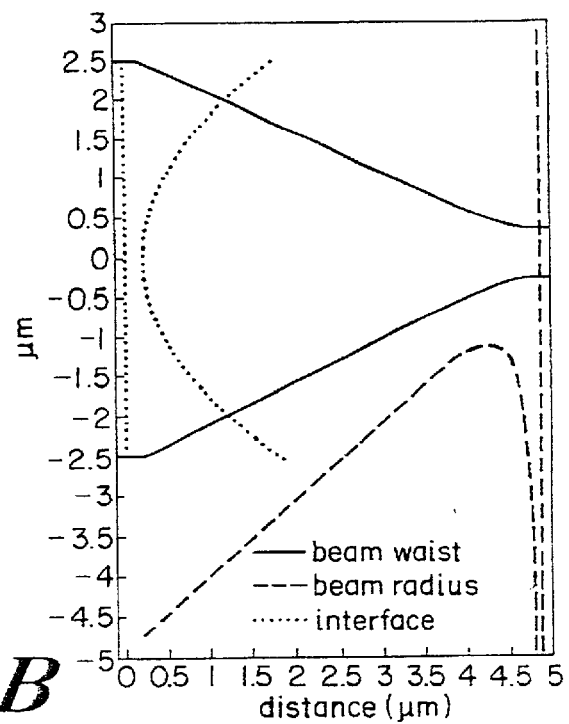

FIG. 2B depicts the expected beam evolution, which shows that the beam diameter can be reduced to well under 1 μm in less than 5 μm. The expected beam waist and phase front radius evolution along the device is obtained by ABCD formalism.

Figure 2C:
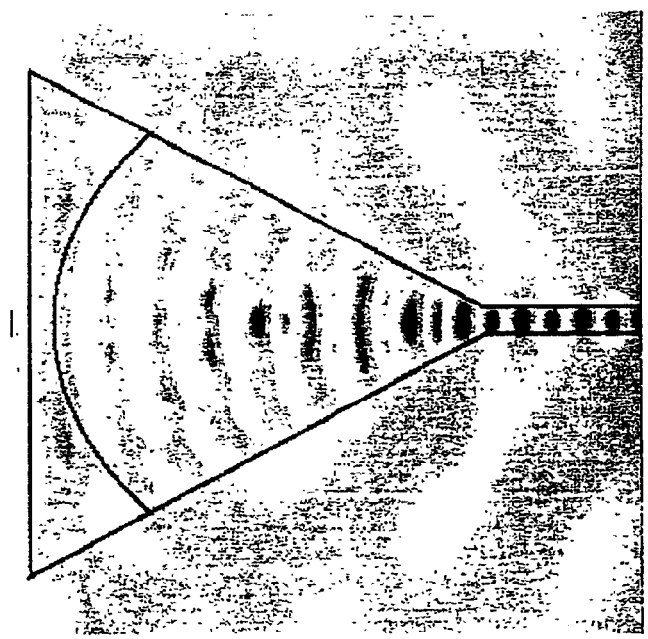
FIGS. 2C–2d and 2E–2F are electric field amplitude diagrams and corresponding spectra graphs, respectively, obtained by FDTD simulation of an embodiment for coupling using a planar lens.
Figure 2D:
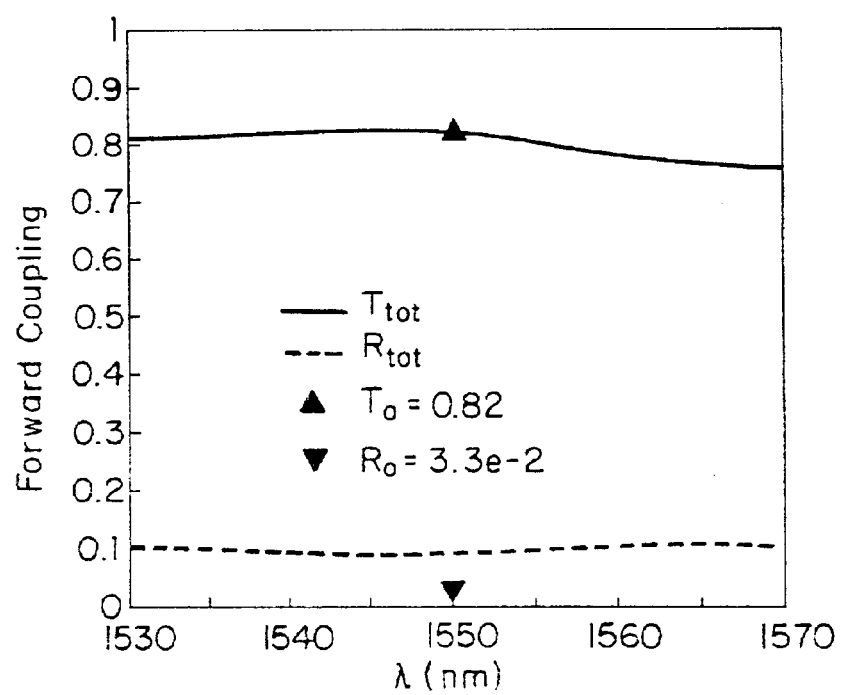

FIG. 2C demonstrates electric field amplitudes for the forward propagation (from fiber to chip) in the planar lens 2 obtained numerically. FIG. 2D depicts the spectra associated with the forward propagation, and shows that 82% of the input power from the fiber is transferred from the fiber to the waveguide and it is all coupled to the fundamental mode of the high index-contrast waveguide.

Figure 2E:
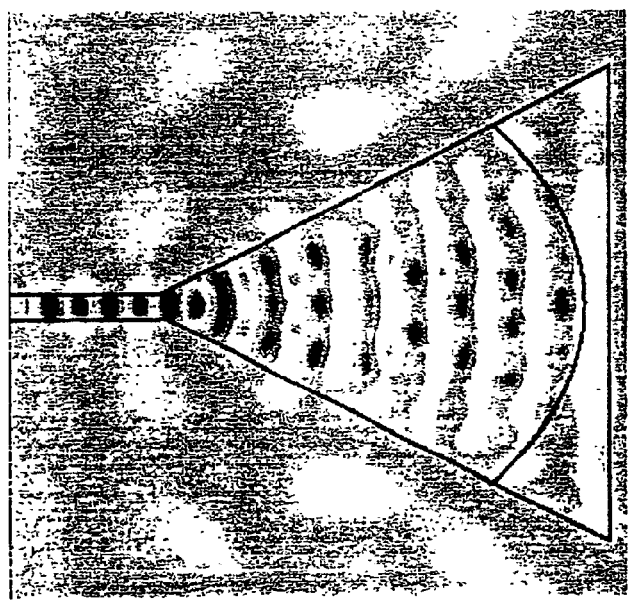
Figure 2F:
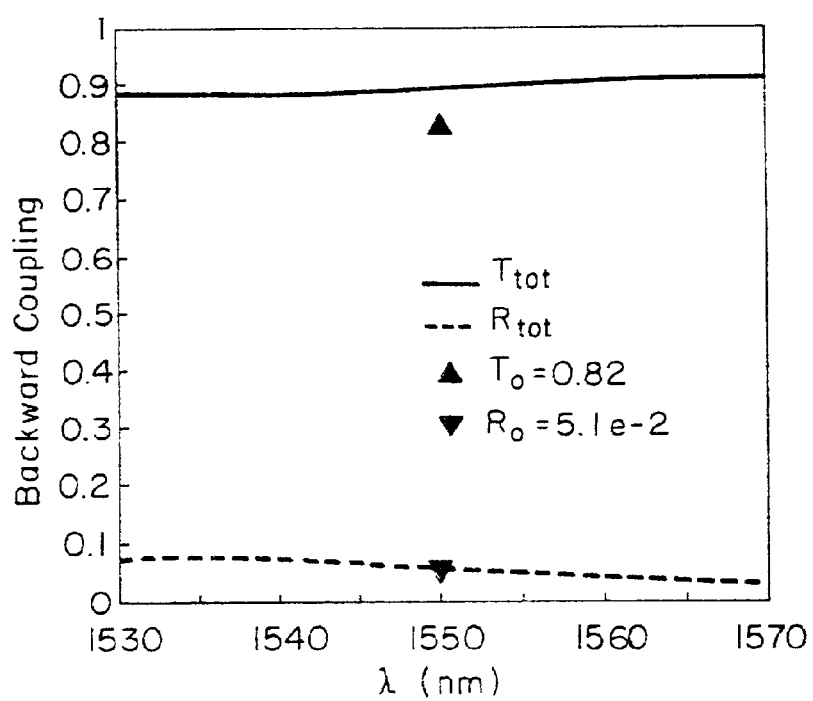

FIG. 2E demonstrates electric field amplitudes for the backward propagation (from chip to fiber) in the planar lens 2. FIG. 2F depicts the spectra associated with the backward propagation. The FDTD calculation of the associated spectrum shows that approximately 89% of the input power from the waveguide is transferred from the chip to the fiber and 82% of the waveguide power is coupled to the fundamental mode of the fiber.

The coupling between the two modes is equal in both directions whereas the total power is higher in the backward direction, because the radius of curvature r is very small, and the impedance matching interface layer 6 greatly deviates from the right thickness away from the center. Moreover, as plane wave fronts of the input beam impinge on the strongly curved interface layer 6, additional reflections are caused due to phase mismatch.

FIGS. 3A–3F illustrate the coupler efficiency of a planar lens. The embodiment presents an improved version of the planar lens shown in FIG. 2A. In this embodiment the impedance matching layer is conformal to the interface between the high-index and the low-index material, thus the proper layer thickness for minimum reflection is approximately maintained along the interface. As discussed hereinbefore, a fiber can be approximated by a gaussian beam using gaussian optics to design lens-like structures that can bring the MFD of the fiber down to that of the integrated waveguide mode. The analytical part of the design can then be based on the well-known transformation laws for gaussian beams using ABCD matrices.

Figure 3A:
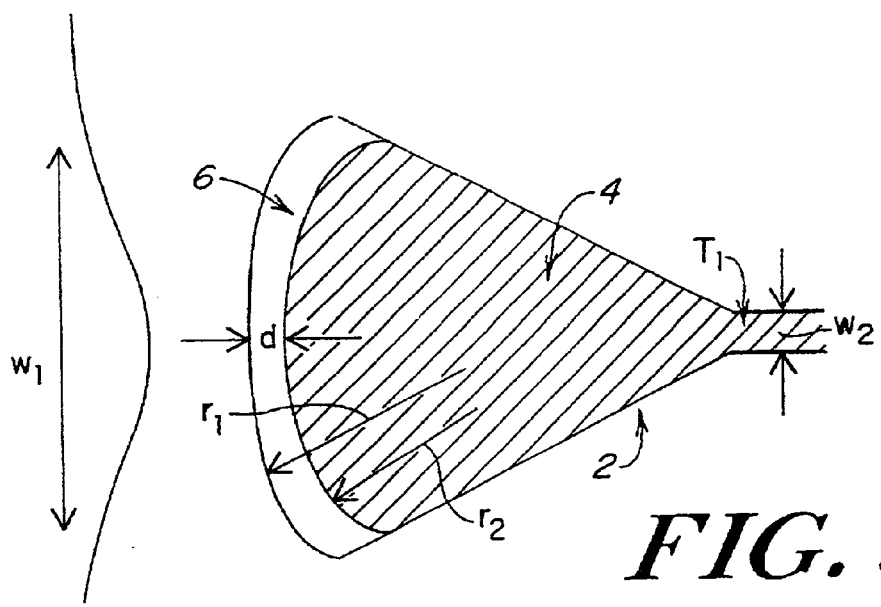
FIGS. 3A and 3B are a schematic block diagram of a planar lens with a conformal impedance-matching layer and a graph of the expected beam evolution when the input is provided by a lensed fiber (MFD=5 μm), respectively.

Also in this embodiment, coupling is achieved through lensing within a distance of only 6 μm. FIG. 3A shows that an interface layer 4 and an interface layer 6 are curved. The structure 2 is surrounded by air ($n_3$=1) or by another low-index material. The interface layer 4 further includes a high index-contrast waveguide T1 with an index $n_1$ of 3, and its radial length r2 is 3 μm. The radial length r2 can vary. The width w2 of the high index waveguide T1 is 0.28 μm. The interface layer 6 has an index $n_2=\sqrt{n_1 n_3}$ that is 1.73 and a thickness d=λ/$4n_2$ that is 0.22 μm, where λ is 1550 nm, is formed on the propagation axis as impedance matching at the location of maximum intensity. Also, the interface layer 6 has a radial length r1 that is 3.3 μm. The radial length r1 can also vary. The mode width w1 of the input fiber is equal to the MFD of the fiber, which is 5 μm. The mode width w1 can vary depending on the dimensions of the planar lens 2.

Figure 3B:
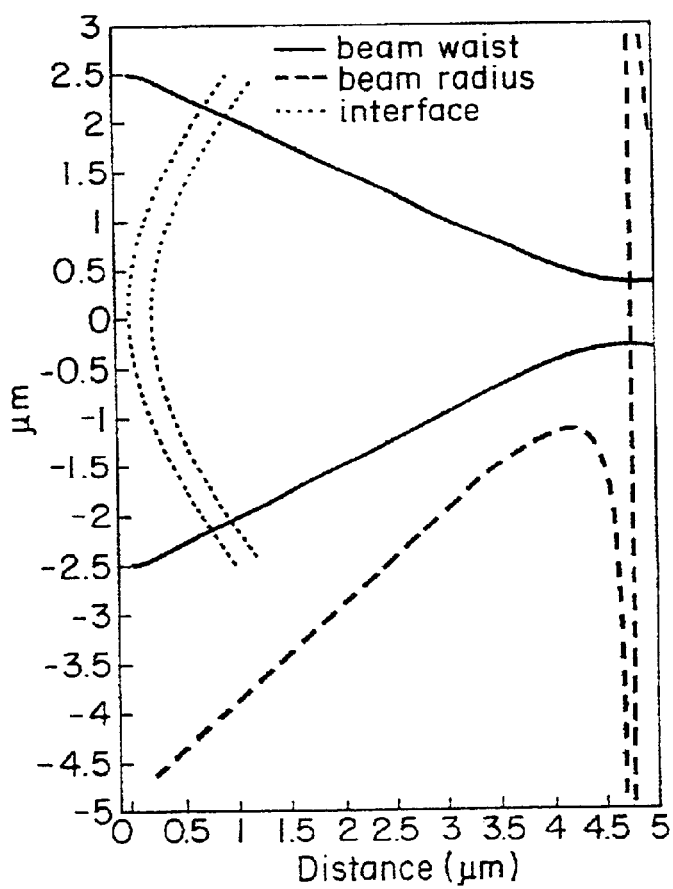

FIG. 3B depicts the expected beam evolution, which shows that the beam diameter can be reduced to well under 1 μm and less than 5 μm. The expected beam waist and phase front radius evolution along the device is obtained by ABCD formalism.

Figure 3C:
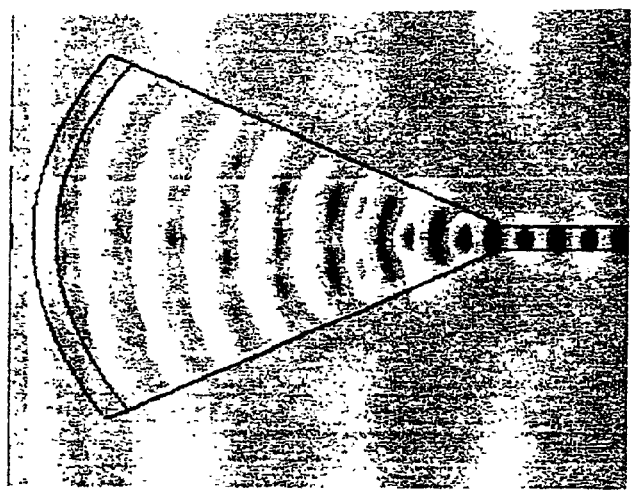
FIGS. 3C–3D and 3E–3F are electric field amplitude diagrams and corresponding spectra graphs, respectively, obtained by FDTD simulation of another embodiment for coupling using a planar lens.
Figure 3D:
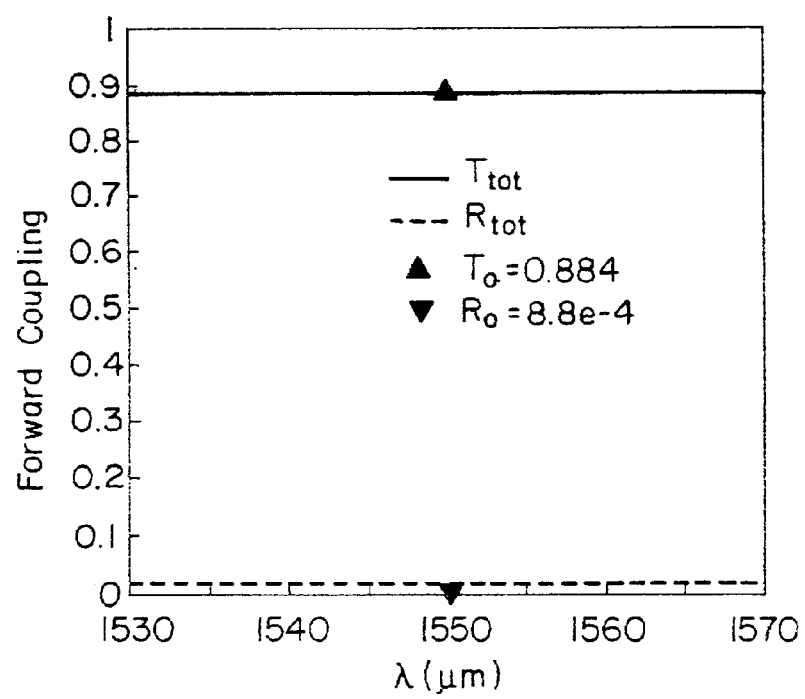

FIG. 3C demonstrates electric field amplitudes for the forward propagation in the planar lens 2 of FIG. 3A. FIG. 3D depicts the spectra associated with the forward propagation. The FDTD calculation of the associated spectrum shows that approximately 89% of the input power is transferred from the fiber to the high index-contrast waveguide T1 all of which is coupled to the fundamental mode of the waveguide.

Figure 3E:
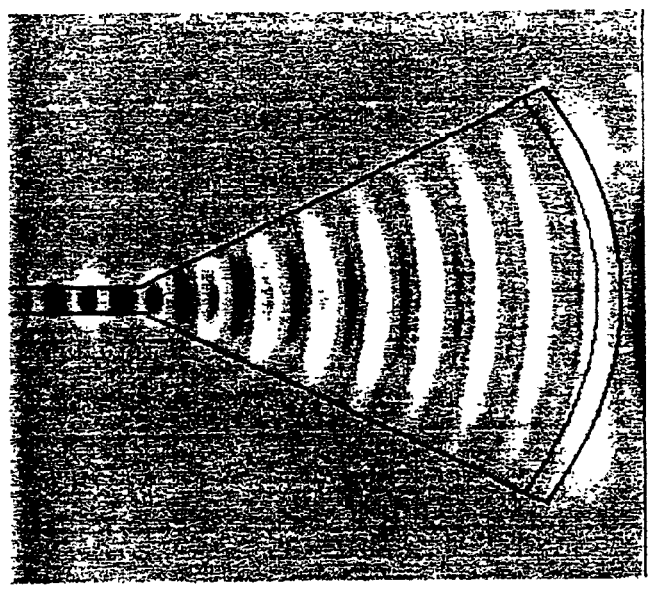
Figure 3F:
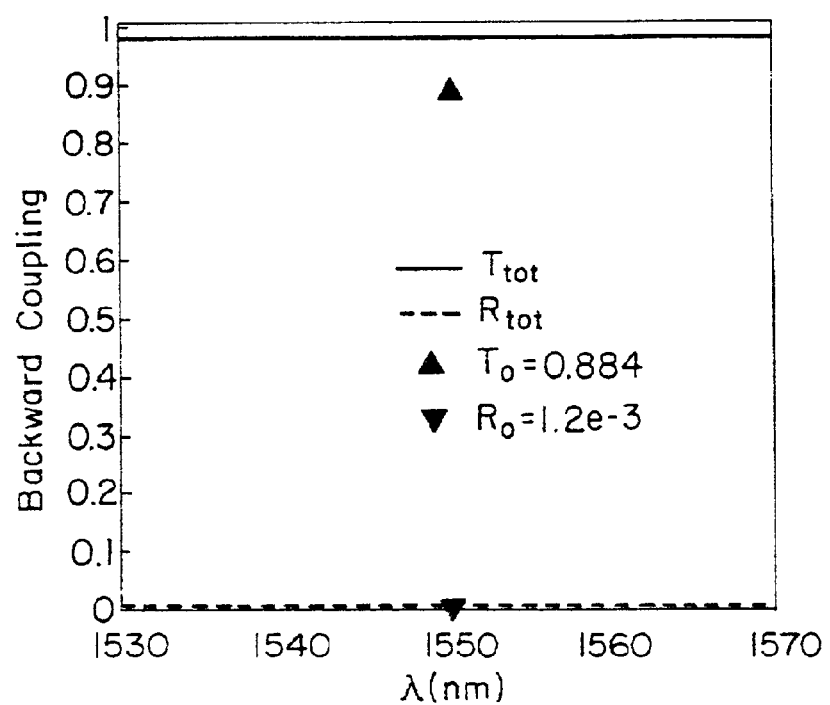

FIG. 3E demonstrates electric field amplitudes for the backward propagation in the planar lens 2. FIG. 3F depicts the spectra associated with the backward propagation. The FDTD calculation of the associated spectrum shows that approximately 98% of the input power from the waveguide is transferred from the chip to the fiber and 89% of the total waveguide power is coupled to the fundamental mode of the fiber.

The coupling between the two modes is equal in both directions whereas the total power is higher in the backward direction. This is due to the fact that as plane wave fronts of the input beam impinge on the strongly curved interface layer 6, additional reflections are caused due to phase mismatch.

The effect of the structure shown in FIG. 3A is the smoother transition from flat to curved wave fronts and vice versa. The thickness of the impedance matching interface layer 6 stays approximately the same on the propagation axis. The results shown in FIGS. 3C and 3F demonstrate an improved performance in both propagation directions and again verify the reciprocity of the coupling between individual modes. The design can be improved by making a gentler curve at the outer interface layer 6.

Figure 4A:
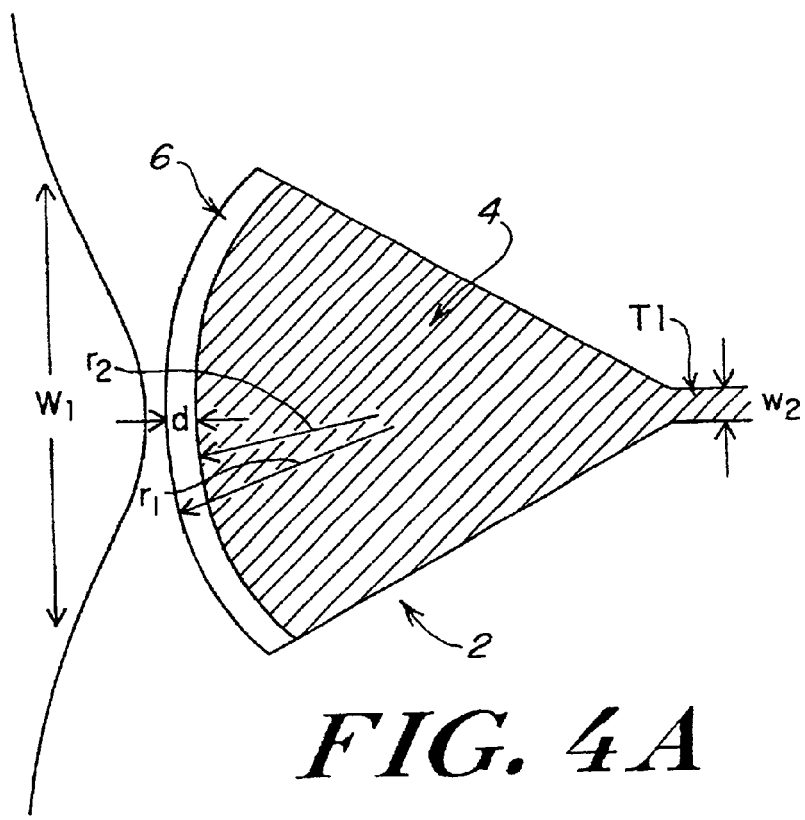
FIGS. 4A and 4B are a schematic block diagram of a planar lens with a conformal impedance matching layer and a graph of the expected beam evolution when the input is provided by a flat-end fiber (MFD=10 μm), respectively.

FIGS. 4A–D demonstrate another embodiment of the planar lens designed for input or output provided by a flat-end fiber (MFD=10 μm) in silicon dioxide ($SiO_2$) cladding. FIG. 4A shows that the interface layer 4 and the interface layer 6 are curved. The structure 2 is curved with silicon dioxide ($SiO_2$) cladding with an index $n_3$ that is 1.5. The input optical fiber, in this embodiment, is surrounded by air, and has an index $n_5$ that is 1. The interface layer 4 further includes a high index-contrast waveguide T1 with an index $n_1$ that is 3, and its radial length r2 is 7 μm. The radial length r2 can vary. The width w2 of the high index waveguide T1 is 0.28 μm.

The interface layer 6 has an index $n_2 = \sqrt{n_1 n_3}$ that is 1.7 and a thickness $d = \lambda/4n_2$ that is 0.22 μm is formed on the propagation axis as impedance matching at the location of maximum intensity, and has a radial length r1 that is 7.5 μm. The radial length r1 is such that the impedance matching layer is conformal to the interface between the high-index and the low-index material, thus the proper layer thickness is approximately maintained along the interface.

Figure 4B:
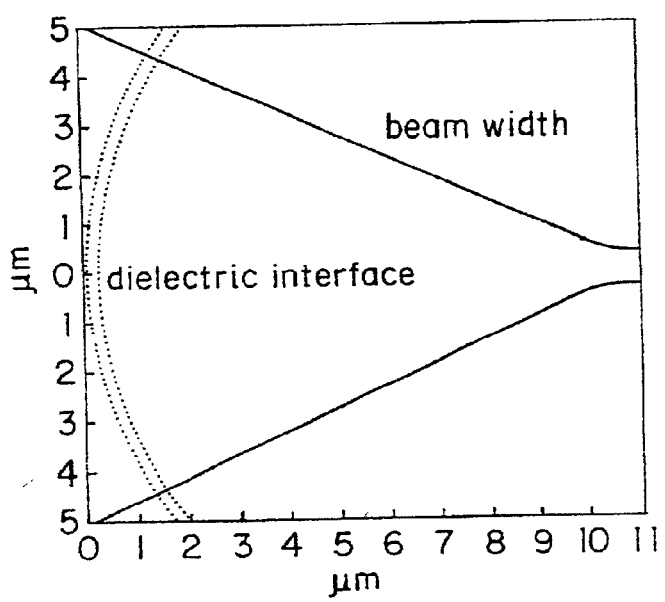

FIG. 4B depicts the expected beam evolution, which shows that the beam diameter can be reduced to less than 1 μm in less than 11 μm. The expected beam waist and phase front radius evolution along the device is obtained by ABCD formalism.

Figure 4C:
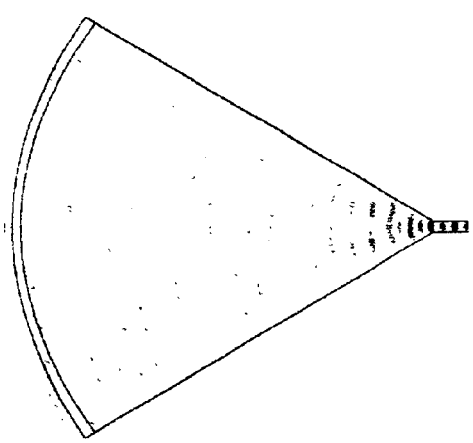
FIGS. 4C and 4D are an electric field amplitude diagram and corresponding spectra graph for the two polarizations of the electric field (TE and TM), respectively.
Figure 4D:
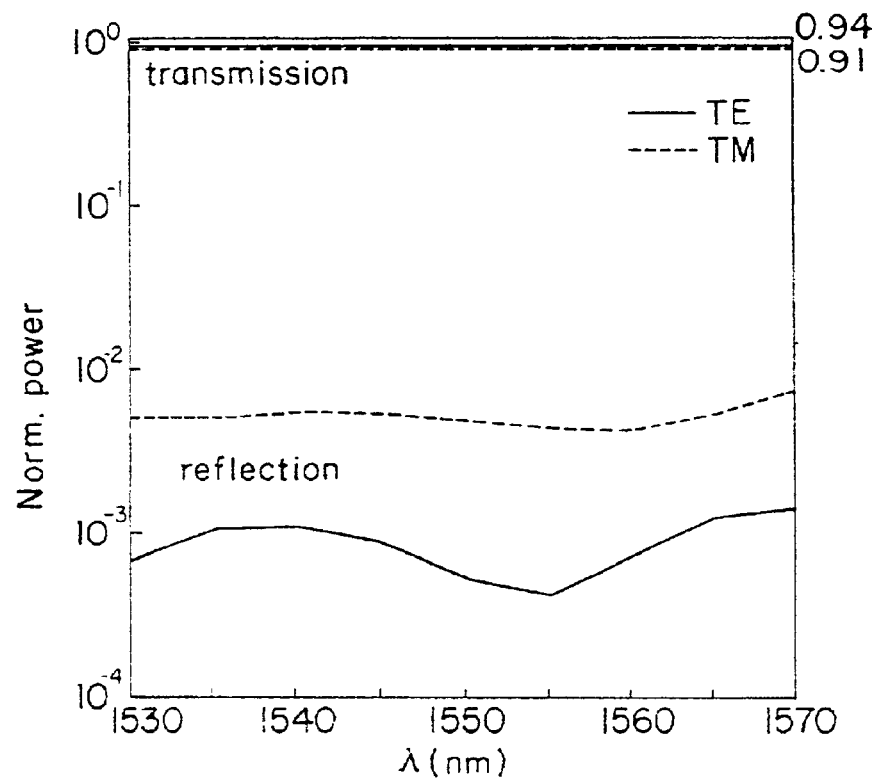

FIG. 4C also shows electric field amplitudes for the forward propagation in the planar lens 2 of FIG. 4A. FIG. 4D depicts the spectra associated with the forward propagation. The FDTD calculation of the associated spectrum shows that approximately between 94% and 91% of the input is transferred from the fiber to the TE polarized and the TM polarized mode of the waveguide, respectively.

Figure 5A:
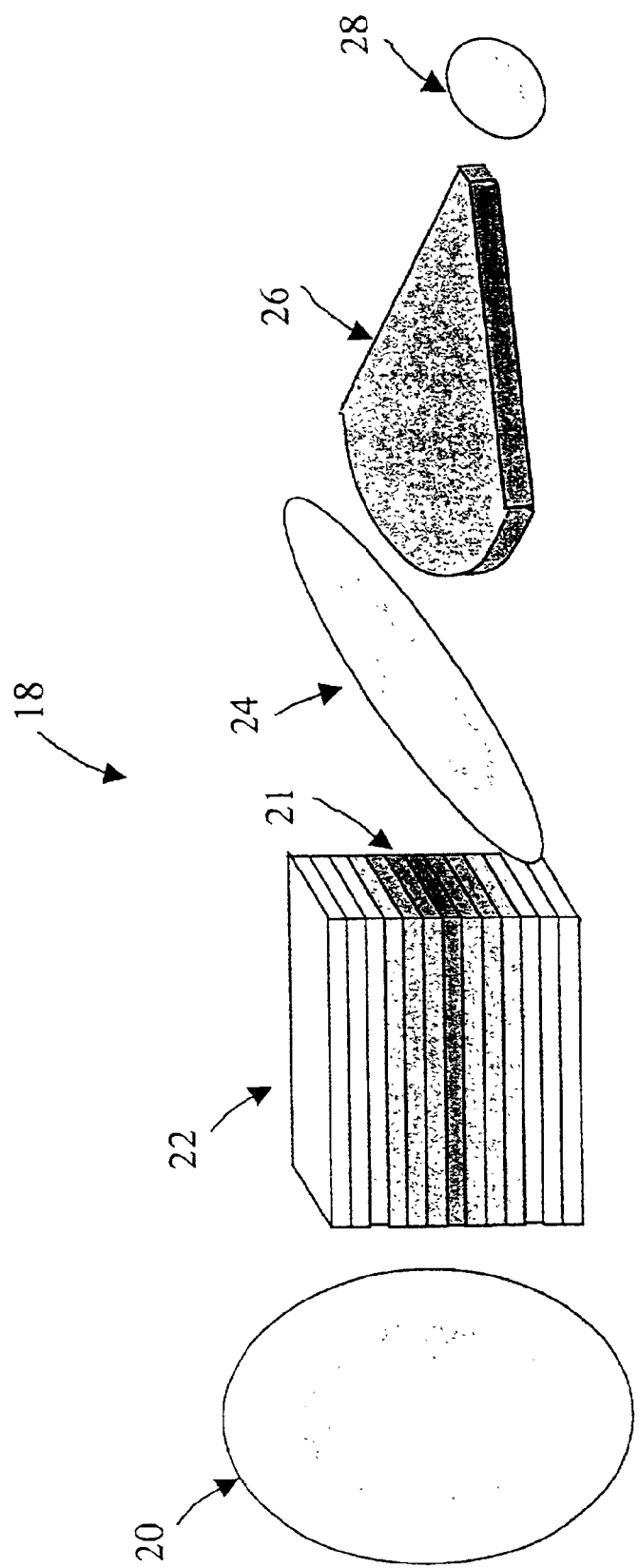
FIGS. 5A–5B are schematic diagrams of two techniques of incorporating vertical and lateral mode conversion in accordance with the invention.
Figure 5B:
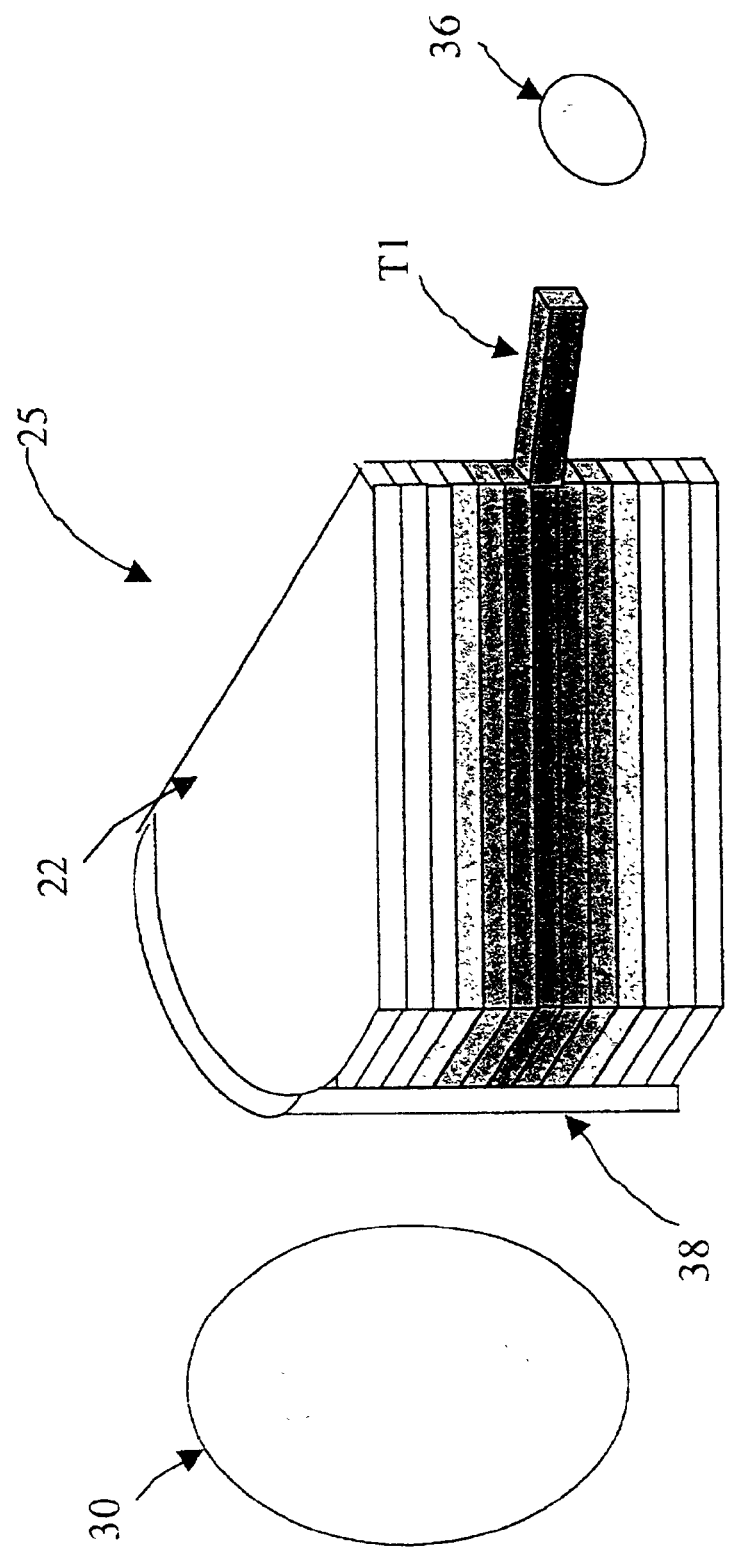

FIGS. 5A–5B show two techniques of incorporating vertical and lateral mode conversion. The previous discussions, herein, regarding the planar lens are in two dimensions and addressed the problem of lateral mode-size conversion, while ignoring variations in the vertical dimension. The treatment of the vertical direction is not obvious in the case of lensing. In theory, the same scheme can work in 3D using a spherical or ellipsoidal lens, the theoretical analysis can be performed separately for the two q-parameters of elliptical gaussian. However, the fabrication of a structure with one or more interfaces with 3D curvature can be a very difficult task. A different approach for vertical focusing must be used, which is suited for fabrication in the vertical direction. The gaussian beam propagation in a quadratic index media is an obvious choice for vertical lensing, and can be a layered structure with the index varying quadratically from layer to layer.

In particular, FIG. 5A demonstrates a 3D coupler system 18. The 3D coupler system 18 includes a layered structure 22 and a lateral mode conversion planar lens 26, and performs both lateral and vertical mode conversion of an input electromagnetic signal 20 of a defined mode size. The layered structure 22 receives the electromagnetic signal 20 and performs vertical mode conversion by way of its various graded index layers 21, and outputs an electromagnetic signal 24. The lateral mode conversion planar lens 26 receives the electromagnetic signal 24, and performs lateral mode conversion on the signal 24 and outputs an electromagnetic 28. The electromagnetic signal 28 has incorporated both lateral and vertical mode conversions, which can be provided to a 3D high index-contrast waveguide or other coupling mechanisms.

FIG. 5B show a 3D coupler 32 that combines the vertical and lateral lensing mechanisms of 22 and 26, respectively, of FIG. 5A. The 3D coupler 25 performs vertical and lateral mode conversion on an electromagnetic signal 30 without requiring two separate vertical and lateral mode conversion modules, and outputs an electromagnetic signal 36 through a high index-contrast waveguide 34 without incorporating substantial reflections and beam spreading in the orthogonal directions. The layer 38 provides impedance matching with proper thickness and index to minimize reflections.

FIGS. 6A–6D illustrate the coupling efficiency of the system described in FIG. 5B. To illustrate the operation of such a coupler in a numerical example, the entire 3D structure is to be modeled over a volume of approximately $10^3$ μm$^3$, which is prohibitive for a full 3D FDTD simulation. The analysis is directed to the xz-pane and yz-plane, and utilizes the fact the evolution of elliptical Gaussian beam can be traced separately in two dimensions. The propagation of the gaussian beam in the layered medium 22 is treated first, the associated effective index is used to link the analyses.

Figure 6A:
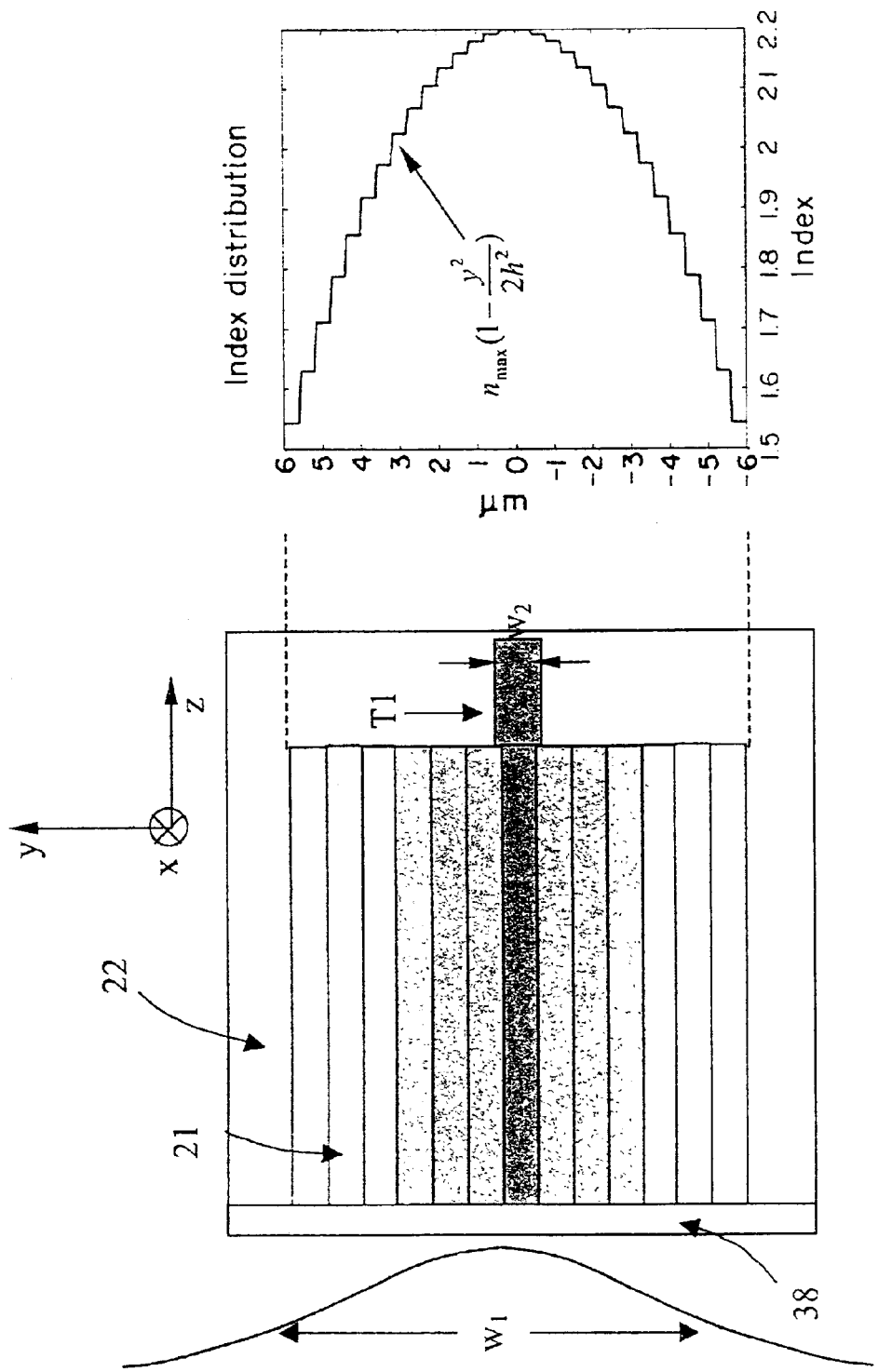
FIGS. 6A–6B and 6C–6D are schematic block diagrams (side view and top view) of the lensing structure of FIG. 5B and associated graphs of the expected beam evolution, respectively.

FIG. 6A shows the layered structure 22, which has an index variation of the form $$n(x, y) = \begin{cases} n_i\left(1 - \frac{x^2}{2h^2}\right) & |x| \leq a \\ n_0 & |x| > a \end{cases} \quad \text{Eq. 2}$$

where, for continuity of the index distribution, $h = a/\sqrt{2(1-n_0/n_1)}$. The length of the layered structure along the z direction is πh/2, which is half the period of variation of the Gaussian beam width in the graded region 21 to ensure maximum beam width narrowing in the x direction. Analytically, the expected variation of the beam width along the z direction is computed and from the variation of the associated effective index is given by:

$$n_e(z) = n_i \left[ 1 - \frac{1}{(k_0 n_i w(z))^2} \right]. \quad \text{Eq. 3}$$

In this embodiment, the value of $n_i$ is 2.2 and $n_0$ is 1.5 and a is 6 μm. These particular index values are chosen such that the graded index is in the range approximately achievable with silicon nitrides. The waveguide T1 also has an index of 2.2 and cladding of 1.5. With h being 7.52 μm, the focal length is $f_1 = \pi h/2 \approx 11.8$ μm. In theory the quadratic index variation of the index given by Eq. 2 is continuous. In practice the variation of the index is piecewise consisting of a multitude of layers with finite thickness. In this embodiment the thickness of each layer is 200 nm. The impedance matching layer 38 has an index that is 1.45 and thickness 0.26 μm.

Figure 6B:
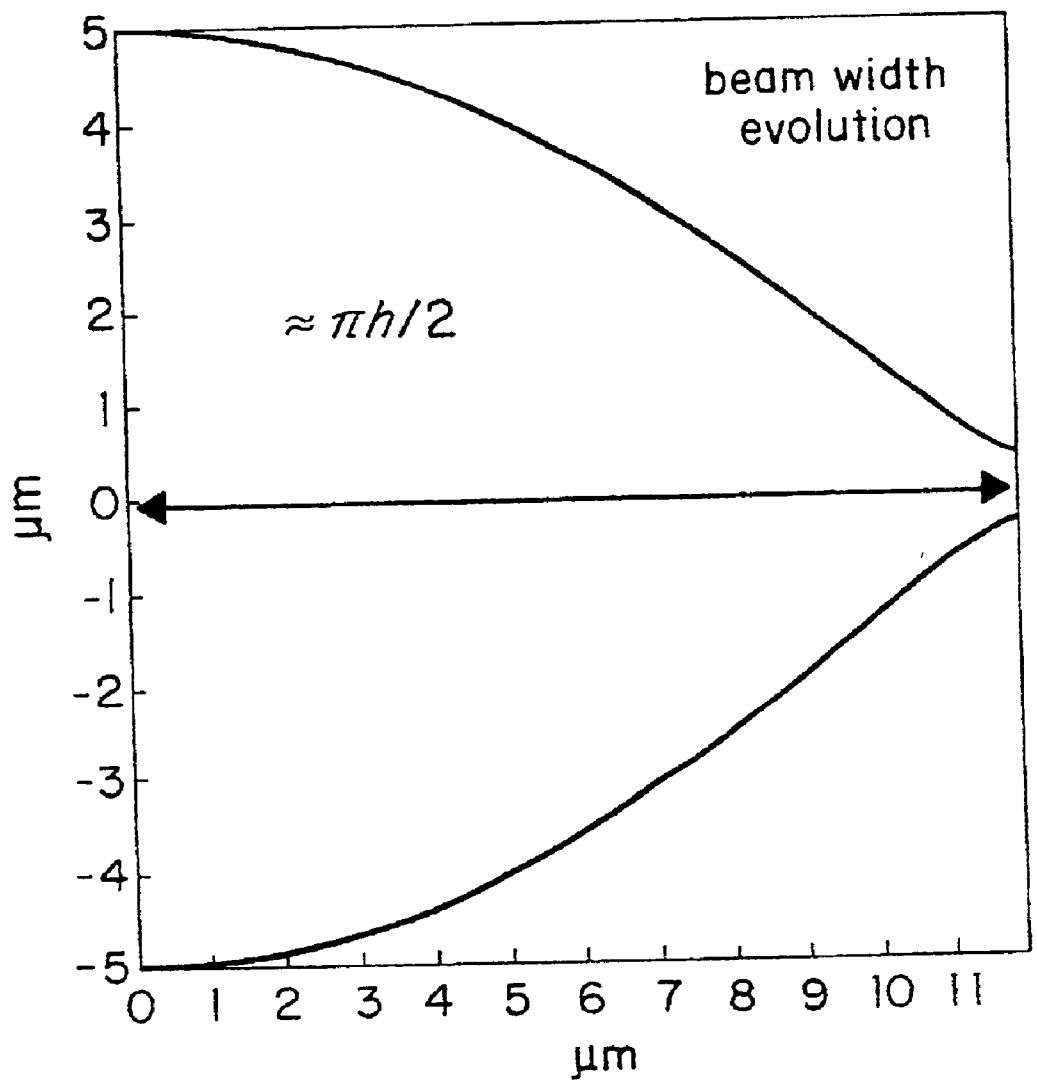

FIG. 6B depicts the expected beam evolution that shows that the beam diameter can be reduced to less than 1 μm in less than 12 μm. The expected beam waist and phase front radius evolution along the device is obtained by ABCD formalism.

Figure 6C:
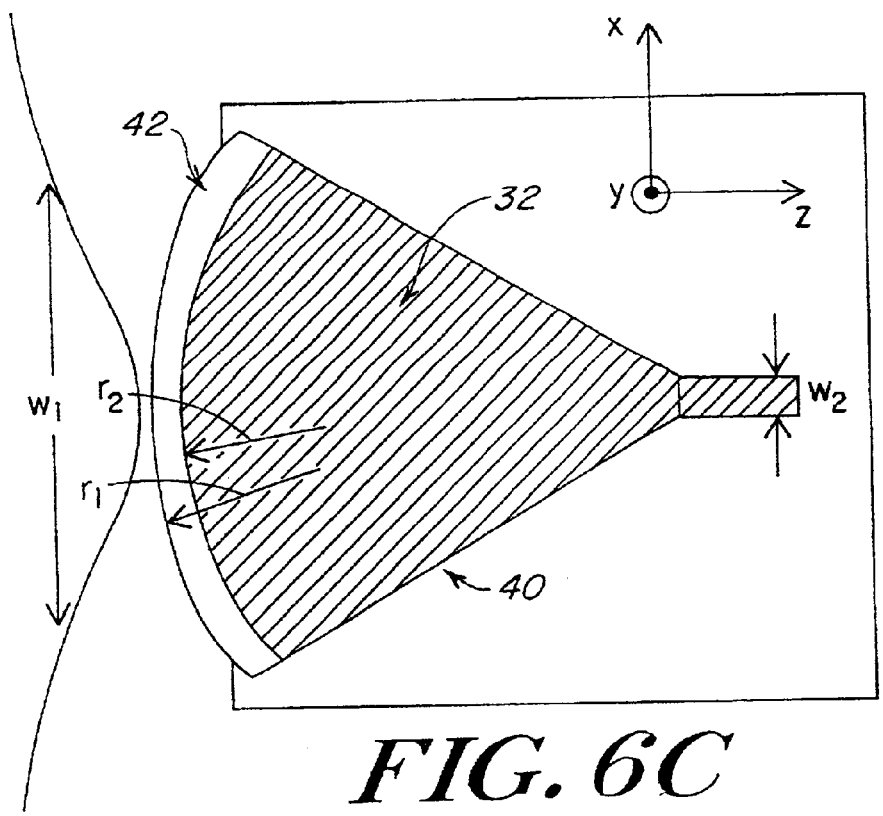

FIG. 6C shows the planar lens 32 that includes an interface layer 40 and an interface layer 42 that are curved. The structure 32 is surrounded by air ($n_3=1$). The interface layer 40 further includes a high index-contrast waveguide T1 with an index of 2.2, and its radial length r2 is 5.25 μm. The radial length r2 can vary. The width w2 of the high index waveguide T1 is 0.28 μm. The interface layer 42 has an index $n_2 = \sqrt{n_1 n_3}$ that is 1.45 and a thickness d that is $\lambda/4n_2 = 0.26$ μm, where λ is 1550 nm, which is formed on the propagation axis as impedance matching at the location of maximum intensity. Also, the interface layer 42 has a radial length r1 that is 5.75 μm. The radial length r1 can also vary. The mode width w1 is equal to the MFD of the input fiber, which is 10 μm. Also, the particular radii r1 and r2 are chosen so that a focal length $f_2$ of the planar lens 32 is equal to the focal $f_1$ of the layered structure 22, which is 11.8 μm.

Figure 6D:
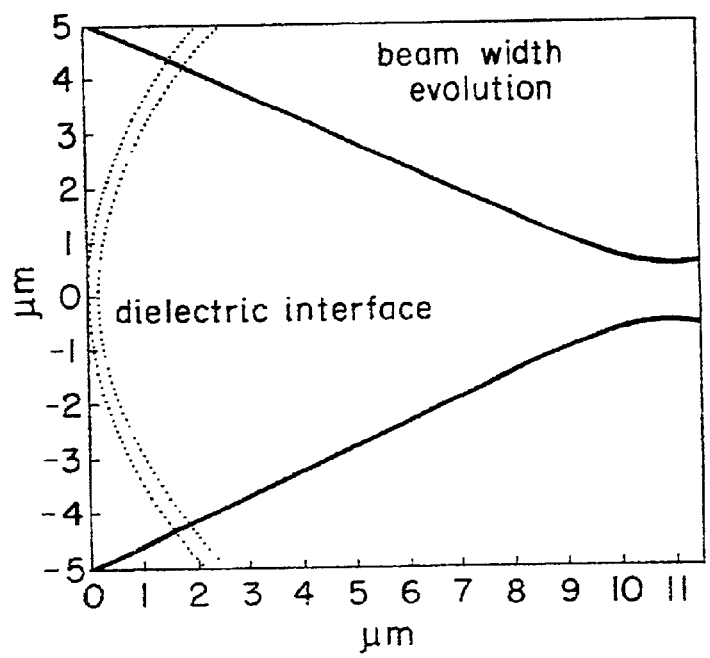

FIG. 6D depicts the expected beam evolution of the planar lens 32, which shows that the beam diameter can be reduced to well under 1 μm and less than 12 μm. The expected beam waist and phase front radius evolution along the device is obtained by ABCD formalism.

FIGS. 7A–7D show the electric field and associated spectra obtained by FDTD for forward propagation in the yz plane and xz plane of the coupler system shown in FIG. 5B.

Figure 7B:
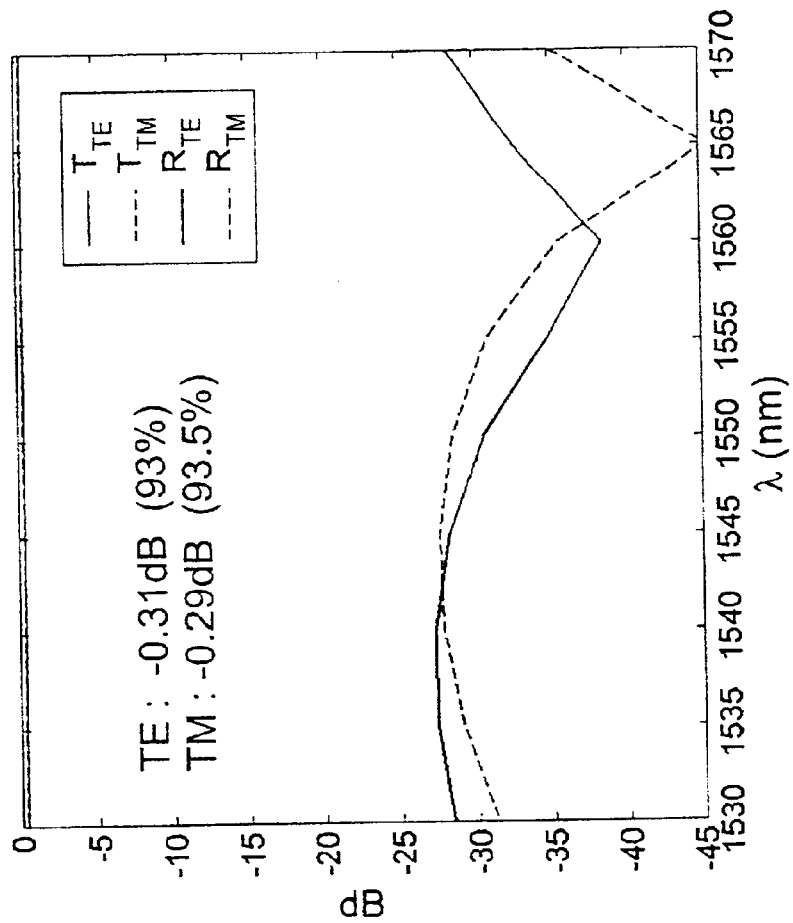
FIGS. 7A–7B and 7C–7D are electric field diagrams and associated spectra graphs, respectively, obtained by FDTD simulations for propagation in the yz plane and xz plane of the coupler system shown in FIG. 5B.
Figure 7A:
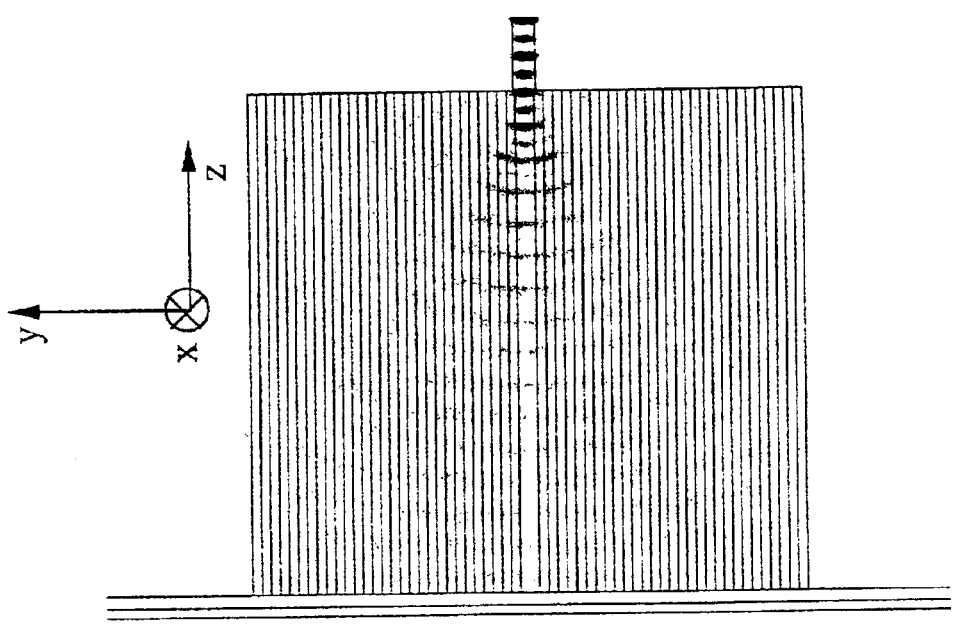

FIG. 7A demonstrates electric field amplitudes for the forward propagation (from fiber to chip) in the layered structure 32 of FIG. 6A. FIG. 7B depicts the spectra associated with the forward propagation. The FDTD calculation of the associated spectrum shows that approximately between 93% and 93.5% of the input is transferred from the fiber to the TE and TM mode of the waveguide, respectively. The same results are obtained for coupling from the waveguide to the fiber.

Figures 7C, 7D:
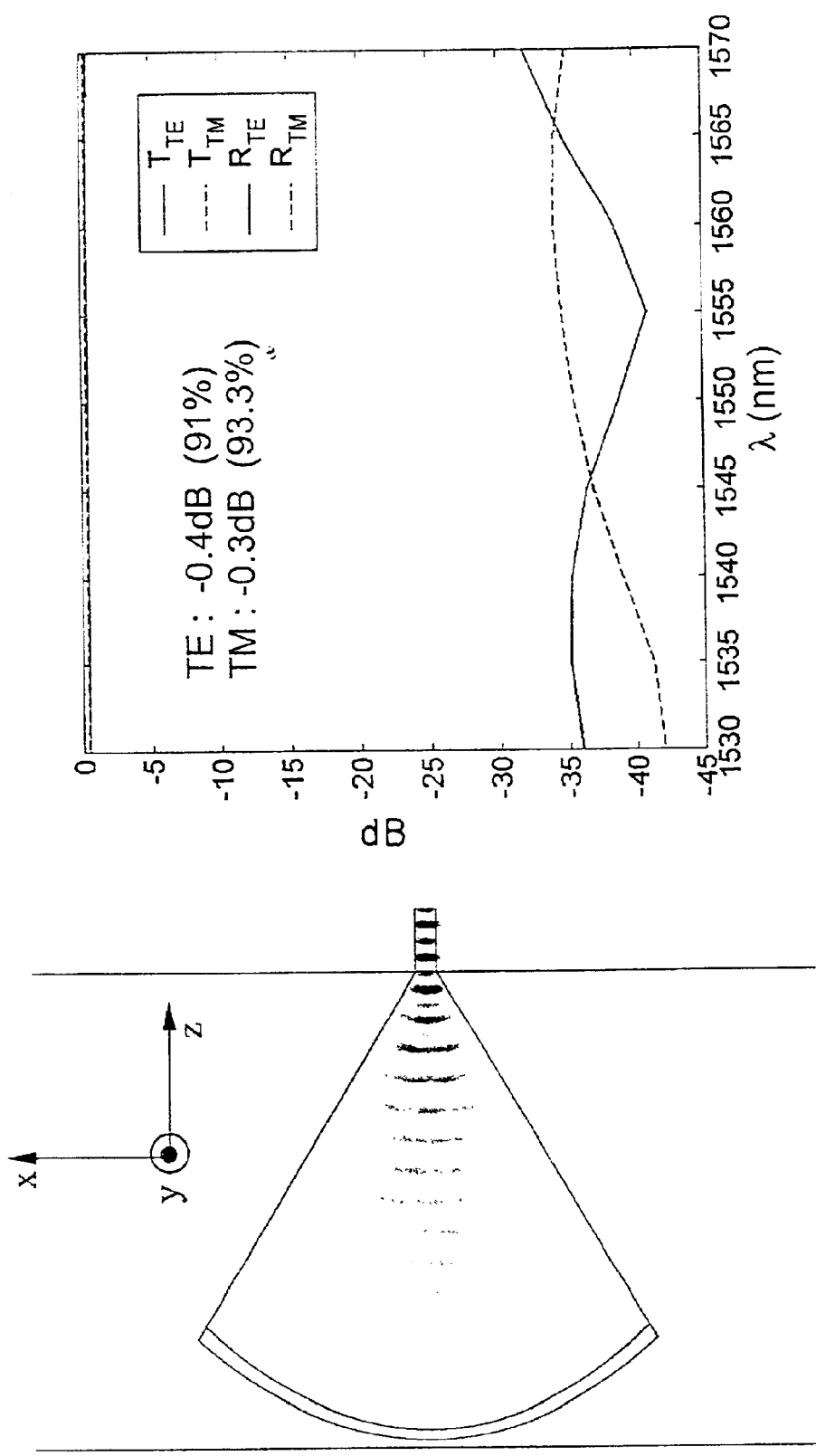

FIG. 7C demonstrates electric field amplitudes for the forward propagation in the planar lens 32 of FIG. 6C. FIG. 7D depicts the spectra associated with the forward propagation. The FDTD calculation of the associated spectrum shows that approximately between 91 and 93.3% of the input is transferred from the fiber to the TE and TM mode of the waveguide, respectively. Same results are obtained for coupling from the waveguide to the fiber.

Figure 7E:
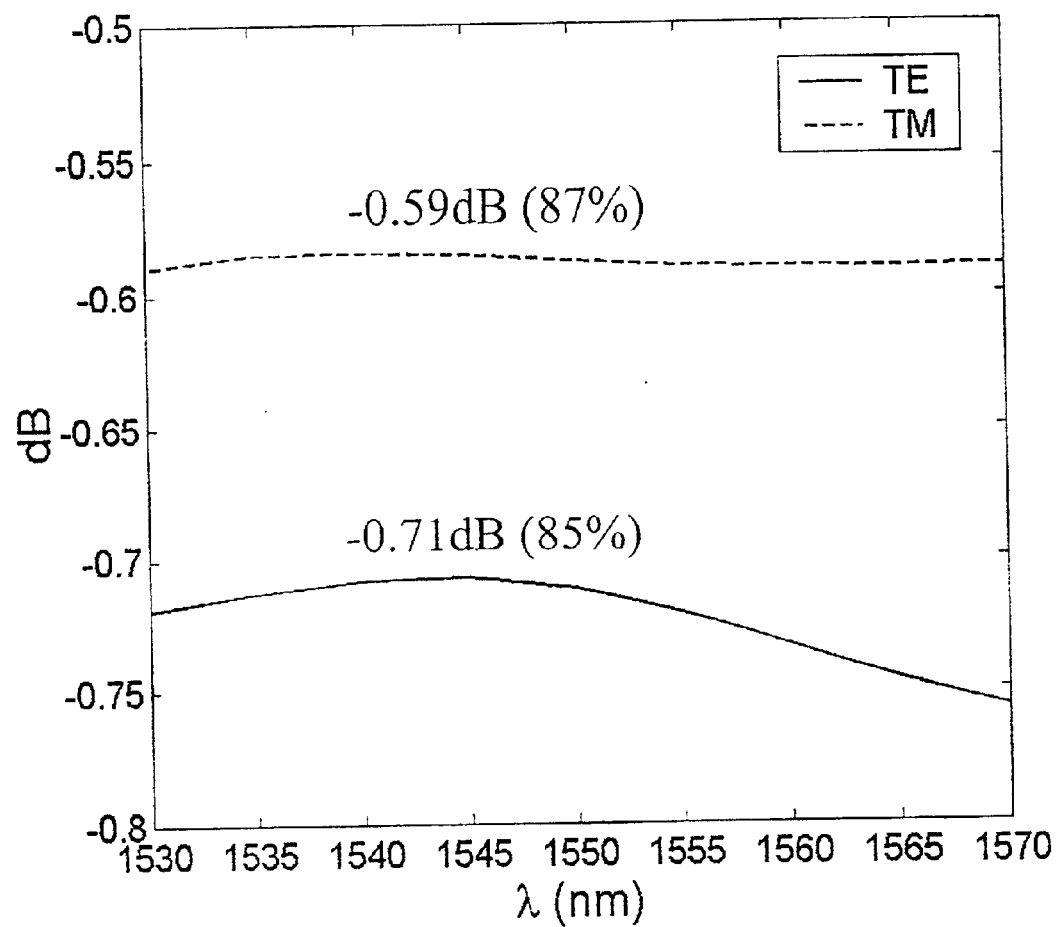
FIG. 7E is an estimated 3D transmission spectra for the two polarizations in the 3D coupling structure of FIG. 5B.

An estimate of the 3D coupling efficiency can be obtained as a product of the spectra for the mode-to-mode 2D coupling of xz and yz planes as shown in FIG. 7E. At 1550 nm the coupling efficiency is 0.93.5×0.91=0.85 for the TE polarization and 0.93×0.93.3=0.87 for the TM polarization, which corresponds to a coupling loss of well under 1 dB. However, this value is much more efficient than any other technique in the art. Better coupling can be obtained with an optimized design of the layered structure 32 where radiation loss seems more likely to occur.

The invention provides an overall 0.5–1 dB loss for the high index-contrast lenses. These structures are very compact and are sized at approximately 10 μm. Implementing the invention can be possible using existing material systems and fabrication. Efficiency of the invention can be improved by reducing the radiation and by using more elaborate lens and AR design.

Although the present invention has been shown and described with respect to several preferred embodiments thereof, various changes, omissions and additions to the form and detail thereof, may be made therein, without departing from the spirit and scope of the invention.

What is claimed is:

1. A planar lens coupling system comprising:

an input fiber providing an input beam of a defined mode size;

a first interface layer of a defined index, said first layer including the radial length of said planar lens;

a high index-contrast waveguide coupled to said first interface layer, said high index-contrast waveguide having the same index as the first interface layer and a mode size that is smaller than said input beam; and a second interface layer of a defined index coupled to said first interface structure, said second interface layer formed on the propagation axis as impedance matching at the location of maximum intensity, wherein said first and second interface layers lower the mode size of said input beam, thus providing coupling between said input fiber and said high index-contrast waveguide.

2. The planar lens of claim 1, wherein said high index-contrast waveguide comprises an index of 3.

3. The planar lens of claim 2, wherein said radial length is 2.5 μm.

4. The planar lens of claim 3, wherein said first interface layer comprises an index of 3.

5. The planar lens of claim 3, wherein said second interface layer comprises an index of 1.73.

6. The planar lens of claim 5, wherein the high index-contrast waveguide comprises a width of 0.28 μm.

7. The planar lens of claim 6, wherein said second interface layer has a thickness of 0.22 μm.

8. The planar lens of claim 7 further comprising a forward and backward propagation.

9. The planar lens of claim 8, wherein said forward propagation is arranged so that said high index-contrast waveguide is coupled to a chip element.

10. The planar lens of claim 8, wherein said backward propagation is arranged so that said high index-contrast waveguide is coupled to said input fiber.

11. The planar lens of claim 9, wherein said forward propagation shows an efficiency of 82%.

12. The planar lens of claim 10, wherein said backward propagation shows an efficiency of 82%.

13. The planar lens of claim 1 further comprising a silicon dioxide cladding covering said planar lens structure.

14. The planar lens of claim 10, wherein said second interface layers has radial length of approximately 3 µm.

15. The planar lens of claim 9, wherein said forward propagation shows an efficiency of 89%.

16. The planar lens of claim 10, wherein said backward propagation shows an efficiency of 89%.

17. A 3D coupling system comprising:
- a layered structure that receives an input of a defined mode size, said layered structure includes a plurality of layers with varying indexes, and outputs a vertically mode converted beam associated with said input beam;
- a planar lens structure that receives said vertically mode converted beam and performs lateral mode conversion on said vertically mode converted beam, said planar lens structure outputs a laterally and vertically mode converted beam; and
- a high index-contrast waveguide structure receiving said laterally and vertically mode converted beam and providing said laterally and vertically mode converted beam to a receiving device.

18. The 3D coupling system of claim 17, wherein said indexes of said layers vary quadratically.

19. The 3D coupling system of claim 17, wherein said high index-contrast waveguide comprises an index of 2.2.

20. The 3D coupling system of claim 19, wherein said high index-contrast waveguide comprises a cladding with an index of 1.5.

21. The 3D coupling system of claim 17, wherein said planar lens further comprises a first interface layer of a defined index, said first layer including the radial length of said planar lens.

22. The 3D coupling system of claim 21, wherein said planar lens further comprises a second interface layer of a defined index that is coupled to said first interface structure, said second interface layer is formed on the propagation axis as impedance matching at the location of maximum intensity.

23. The 3D coupling system of claim 22, wherein said first and second interface layers lowering the mode size of said input beam, thus providing coupling between said input fiber and said high index-contrast waveguide.

24. The planar lens of claim 23, wherein said radial length is 5.25 µm.

25. The planar lens of claim 24, wherein said first interface layer comprises an index of 2.2.

26. The planar lens of claim 24, wherein said second interface layer comprises an index of 1.5.

27. The planar lens of claim 26, wherein the high index-contrast waveguide comprises a width of 0.28 µm.

28. The planar lens of claim 27, wherein said second interface layer has a thickness of 0.26 µm.

29. The planar lens of claim 28 further comprising a forward and backward propagation.

30. The planar lens of claim 28, wherein said forward propagation is arranged so that said high index-contrast waveguide is coupled to a chip element.

31. The planar lens of claim 28, wherein said backward propagation is arranged so that said high index-contrast waveguide is coupled to said input fiber.

32. The planar lens of claim 29, wherein said forward and backward propagation shows an efficiency of approximately 93% for the layered structure.

33. The planar lens of claim 29, wherein said forward propagation shows an efficiency of approximately 93% for the planar lens.

34. A 3D coupling system that simultaneously performs vertical and lateral mode conversion, said 3D coupling system comprising:
- a layered structure in the vertical dimension of said 3D coupling system with quadratically varying refractive index that converts an input fiber mode-size to match the vertical mode-size of an output high index contrast waveguide, and
- a planar lens structure in the lateral dimension of said 3D coupling system having a curved interface, said curved interface having a radius that is chosen to laterally convert the input fiber mode-size to match the lateral mode-size of the output high index contrast waveguide.

35. The 3D coupling system of claim 34 further comprising an impedance matching layer of proper index and a quarter-wavelength thickness to minimize reflections.

36. The 3D coupling system of claim 34, wherein said vertical and lateral mode conversion have the same focal lengths.

* * * * *